United States Patent
Souissi

(10) Patent No.: US 6,567,649 B2
(45) Date of Patent: May 20, 2003

(54) METHOD AND APPARATUS FOR TRANSMITTER NOISE CANCELLATION IN AN RF COMMUNICATIONS SYSTEM

(75) Inventor: Slim Salah Souissi, San Diego, CA (US)

(73) Assignee: Novatel Wireless, Inc., San Diego, CA (US)

( * ) Notice: Subject to any disclaimer, the term of this patent is extended or adjusted under 35 U.S.C. 154(b) by 0 days.

(21) Appl. No.: 09/935,484

(22) Filed: Aug. 22, 2001

(65) Prior Publication Data

US 2002/0072344 A1 Jun. 13, 2002

Related U.S. Application Data

(60) Provisional application No. 60/227,134, filed on Aug. 22, 2000.

(51) Int. Cl.[7] .................................................. H04B 1/44
(52) U.S. Cl. ........................................ 455/83; 455/296
(58) Field of Search ...................... 455/82, 550, 67.4, 455/24, 63, 278.1, 226.1, 296, 67.1, 115, 83, 67.3

(56) References Cited

U.S. PATENT DOCUMENTS

| | | | |
|---|---|---|---|
| 5,574,978 A | 11/1996 | Talwar et al. | |
| 5,630,223 A | 5/1997 | Bahu et al. | |
| 5,974,301 A | 10/1999 | Palmer et al. | |
| 5,995,567 A | 11/1999 | Cioffi et al. | |
| 6,069,580 A | * 5/2000 | Martinson | .................. 342/20 |
| 6,169,912 B1 | 1/2001 | Zuckerman | |

* cited by examiner

Primary Examiner—Nguyen T. Vo
(74) Attorney, Agent, or Firm—Coudert Brothers LLP

(57) ABSTRACT

A method and apparatus is provided for reducing or eliminating the transmitter signal leakage, i.e., transmitter noise, in the receiver path of an RF communications system operating in full duplex mode. In an embodiment of the present invention, a noise cancellation loop produces an estimated transmitter signal leakage and cancels it from the receiver path to produce a received signal with little or no transmitter noise. Some of the advantages are that there is significant improvement in the isolation between the transmitter/receiver circuits, the size of the RF communications circuitry may be reduced, and the RF transmit module along with the RF receive module may be incorporated into a single RF IC chip.

31 Claims, 9 Drawing Sheets

METHOD AND APPARATUS FOR TRANSMITTER NOISE CANCELLATION IN AN RF COMMUNICATIONS SYSTEM

CROSS REFERENCES

This application claims priority from and incorporates by reference in its entirety U.S. Provisional Application Serial No. 60/227,134, titled "Method and Apparatus for Transmitter Noise Cancellation in an RF IC," by Slim Souissi, filed Aug. 22, 2000.

BACKGROUND OF THE INVENTION

The present invention relates generally to full duplex radio frequency (RF) circuits and more particularly to reducing or eliminating transmitter signal leakage into the receive path of an RF circuit.

The accelerating demand for wireless communications such as cellular and cordless telephones, has motivated new research in RF integrated circuits (ICs). This new research emphasizes highly integrated designs, for lower cost, lower power consumption, and smaller form factors. One aspect involves locating the RF transmitter and RF receiver circuit closer and closer together with a goal of having them both on a single Integrated Circuit (IC) chip.

However, moving the RF transmitter circuit closer to the RE receiver circuit in the full duplex communication case, results in signal leakage from the transmitter circuit into the receive circuit path. This is solved conventionally by physical or mechanical isolation. Current solutions for RF communications systems having RF IC's include either using separate chips for the transmit and receive paths or using a special isolation material to minimize the transmit signal leakage between the transmit path and the receive path. A drawback of such conventional solutions is that they limit the amount by which the size of the transmitter and receiver circuits may be reduced. Such solutions are therefore impractical for building a single chip solution that meets the tight specifications of today's wireless standards.

An alternative to mechanical or physical isolation is to provide some sort of electronic solution. However, while techniques for cancellation of interference from external transmitter sources exist, techniques for canceling internal transmitter signal leakage in the receive path are lacking, especially if the transmit and receive circuits are on a single IC. An example of a conventional technique is given in U.S. Pat. No. 5,974,301 by Palmer, et. al, entitled "Frequency Canceling System and Method," issued on Oct. 26, 1999 (hereinafter referred to as Palmer). Palmer discloses generating a reference signal and then adjusting it to be 180 degrees out of phase and equal in amplitude to an interference signal. The reference signal is then added to the interference signal to cancel out the interference signal. In Palmer, the reference signal is generated when the other external sources, called radio frequency tag devices, are not sending communication signals. Hence the reference signal is a measure of the external interference. Interference from signals outside the RF communications system has some substantial differences from internal transmitter signal leakage. Some of the differences include: the RF communications system has little or no control over these external interference sources; these techniques still rely on physical or mechanical isolation to reduce the internal transmitter leakage; and the analog RF transmitter and receiver circuitry are not on the same IC chip. Hence, there is still the problem of canceling internal transmitter leakage.

Therefore, for an RF communications system having co-located receiver and transmitter circuits, and operating in full duplex mode, there is a need for techniques that reduce or eliminate the transmitter signal leakage into the receiver path. In addition, there is a need for techniques which allow the placement of the transmitter and receiver RF circuits on a single IC.

SUMMARY OF THE INVENTION

The present invention provides a method and apparatus for reducing or eliminating the transmitter signal leakage, i.e., transmitter noise, into the receiver path of an RF communications system operating in full duplex mode. In an embodiment of the present invention a noise cancellation loop produces an estimated transmitter signal leakage and cancels it from the receive path to produce a received signal with little or no transmitter noise, Some of the advantages are that there is significant improvement in the isolation between the transmit/receive circuits, the size of the RF communications circuitry may be reduced, and the RF transmit module along with the RF receive module may be incorporated into a single RF IC chip.

In one embodiment of the present invention, a method in a RF communications system for improving a received communications signal during full duplex operation is provided. The RF communications system includes a transmitter circuit and a receiver circuit. The method determines a first estimation of a signal leakage from the transmitter circuit, when the received communications signal is not being received by the receiver circuit. Next, when the RF communications system is in full duplex operation and the transmitter circuit is generating a transmit communication signal, a second estimation of said signal leakage is determined based on the first estimation and said transmit signal. Lastly, the second estimation is combined with the received communications signal, such that the signal leakage is substantially cancelled in the received communications signal.

In another embodiment of the present invention, a method in an RF IC communications system is provided for substantially canceling transmitter noise during full duplex operation. The RF IC communications system includes a transmitter and a receiver. The RF IC communications system is calibrated by sending a calibration signal to a transmit noise cancellation loop circuit. Next loop parameters for the transmit noise cancellation loop circuit are determined. Then when in full duplex operation, a transmit noise signal based on the loop parameters is estimated, and the transmit noise signal is substantially cancelled from a received signal. In one embodiment the transmitter and receiver are on one RF IC chip. In another embodiment they are co-located, but on separate IC chips.

An RF communications system that substantially cancels transmitter noise during full duplex operation is provided in an embodiment of the present invention. The system includes: a transmit path coupled to a noise cancellation loop, and when the RF communications system is in full duplex mode, the transmit path is coupled to an antenna. Also included is a receive path coupled to the noise cancellation loop, and when the RF communications system is in full duplex mode, the receive path is coupled to the antenna and the transmit path. The system further includes the noise cancellation loop for approximating a transmit noise signal from the transmit path and canceling the transmit noise signal from a received signal going to the received path. These and other embodiments, features, aspects and advantages of the present invention will become better understood with regard to the following detailed description, appended claims, and accompanying drawings.

DETAILED DESCRIPTION OF THE SPECIFIC EMBODIMENTS

Figure 2:
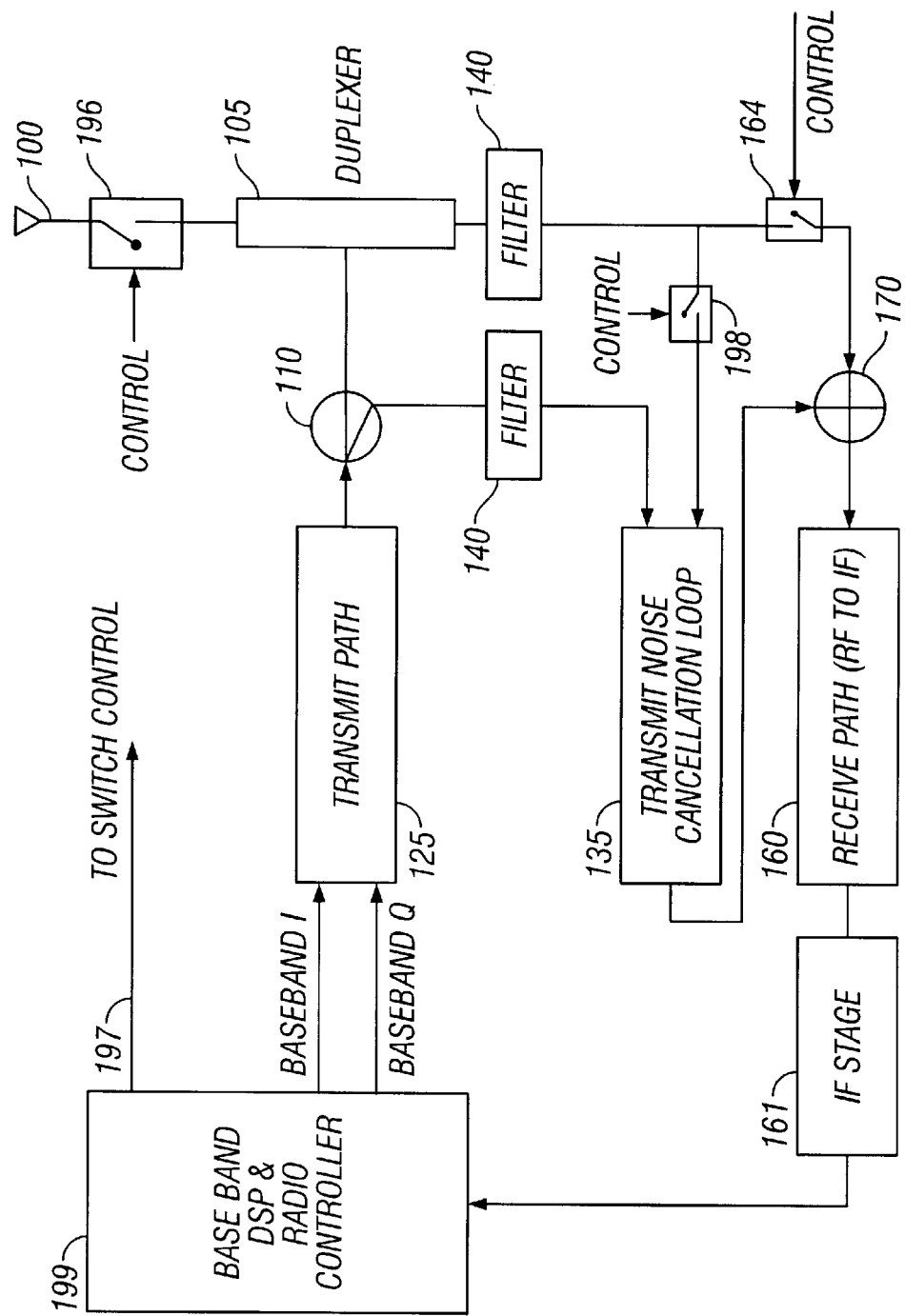
FIG. 2 shows a functional block diagram of the transmit noise cancellation technique according to one embodiment of the present invention.

FIG. 2 shows a functional block diagram of the transmit noise cancellation technique according to one embodiment of the present invention. FIG. 2 includes an RF communications system having: a transmit path 125, a receive path 160, and a noise cancellation loop 135, where the noise cancellation loop 135 approximates the transmit noise signal and subtracts it from the received signal in the receive path 160. This embodiment improves reception of a communication signal which is detected in the presence of interference from co-located transmit/receive sources. The noise cancellation system is based on two modes of operation, a calibration mode and a noise cancellation mode. During the calibration mode, switches 196, 164, and 198 are set to be open, open, closed, respectively. A base band controller 199 generates a calibrating signal based on a pre-stored PN sequence. The calibration signal is split into two signals by means of a low noise signal splitter 110. Each of the split signals takes a different path. A first signal (referred to as the reference signal) takes a first path which goes through a first filter 140 directly to the transmit noise cancellation loop 135. A second signal (referred to as the transmit noise signal) takes a second path which goes through duplexer 105 and a second filter 140 to the same noise cancellation loop 135. The noise cancellation loop uses an estimation algorithm to estimate a gain factor and a phase correction factor. During the noise cancellation mode switches 196, 164, 198 are set to (closed, closed, open) respectively; the estimated phase and gain factors are applied to the first signal which results into an equivalent transmit noise signal. The equivalent noise signal is amplitude and phase adjusted to have substantially the same amplitude and to be 180 degree out of phase with the transmitted interfering signal component of the received signal. The received signal and the noise equivalent signal are added by adder 170 to produce a received signal substantially or completely without transmit noise.

Figure 1:
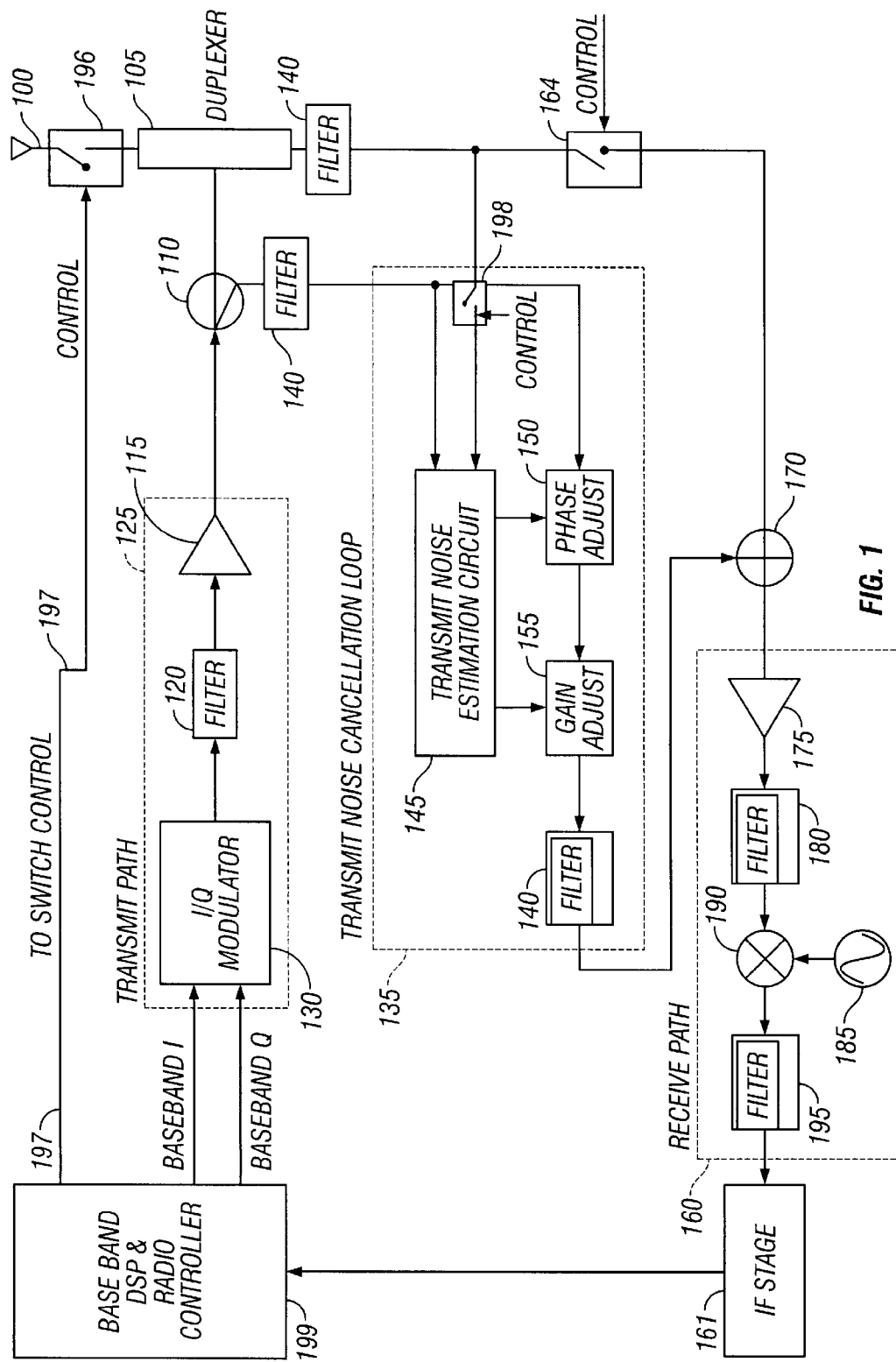
FIG. 1 shows an implementation of the transmit noise cancellation technique according to one embodiment of the present invention.

FIG. 1 shows an implementation of the transmit noise cancellation technique according to one embodiment of the present invention. It includes a base band processor/radio controller 199, a transmit path 125, a receive path 160, an IF stage 161, and a transmit noise cancellation loop 135. The embodiment operates according to two different modes.

Figure 5:
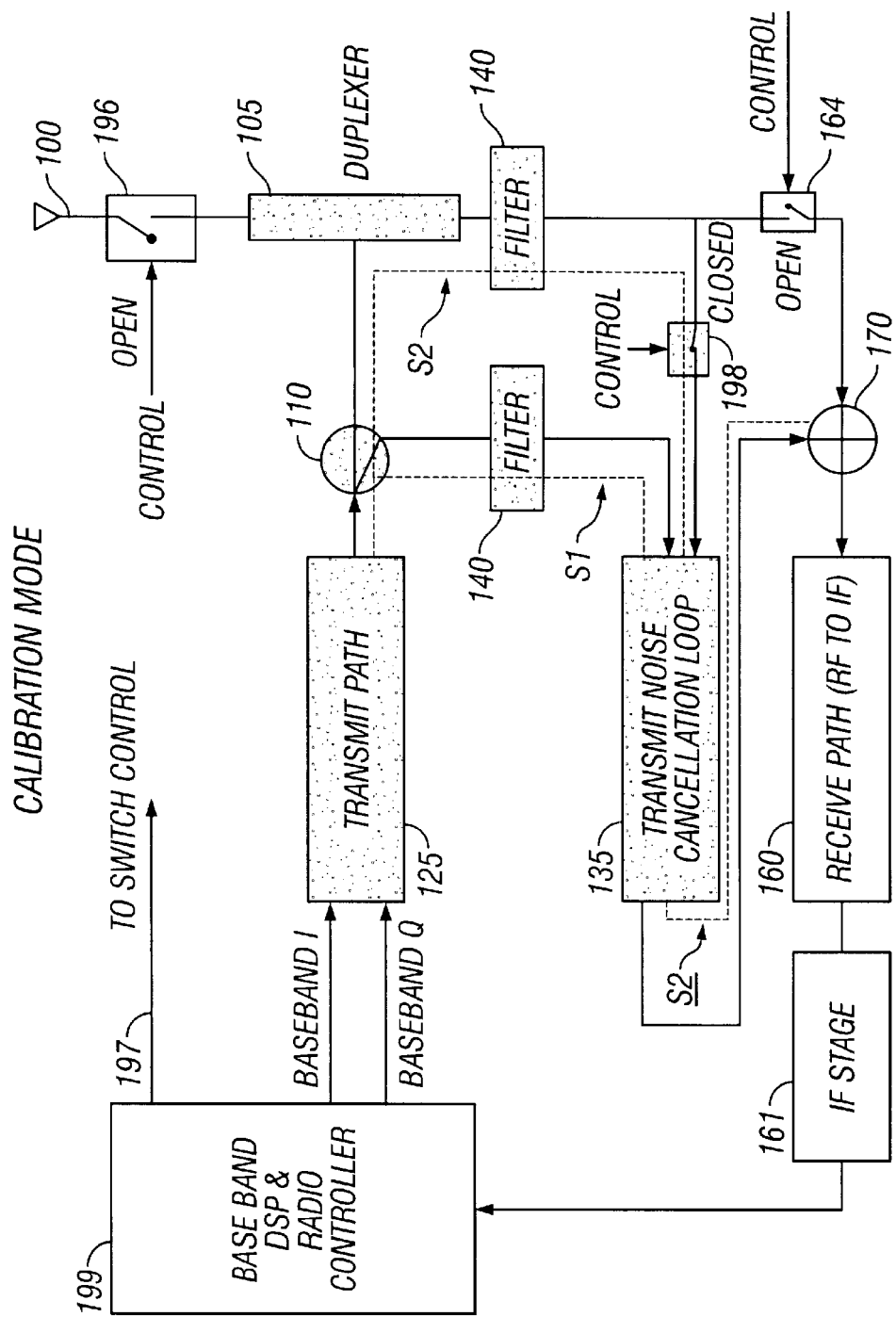
FIG. 5 shows a block diagram for the system operation during the calibration mode according to one embodiment of the present invention.

Referring to FIGS. 1 and 5, the first mode is a calibration mode. During the calibration mode, the antenna 100 is disconnected from the rest of the radio. This can be done simply by using a programmable switch 196 that connects the antenna 100 to a duplexer 105. The programmable switch may be a low insertion loss PIN diode such as the Amplifonix TWP2202 PIN diode, which has a 0.5 dB insertion loss and which spans frequencies from DC to 3 GHz. The reason for disconnecting the antenna from the rest of the transceiver is to isolate the radio from any external source of interference on the receive band. Interference in this case could include received signals inside the receive band or adjacent and co-channel signals within the receive band. Also during this mode, switch 164 is held open while switch 198 is held closed. All the switches are controlled by the radio controller 199.

Referring again to FIGS. 1 and 5, the calibration process takes place in an isolated and self controlled radio environment. Because of the antenna disconnection, there is no risk of receiving any signal from any external sources. The radio controller preferably sends a sequence of calibration bits based on a PN sequence. The calibration bits go through the transmit path which includes an I/Q modulator 130, a transmit filter 120, and a power amplifier 115. The resulting calibration signal is split into two signals by means of splitter 110. A first signal takes a first path and a second signal takes a second path. The first signal S1, also referred to as a reference signal, goes through receive filter 140, while the second signal S2, referred to as a transmit noise signal, goes through duplexer 105 and receive filter 140. S1 and S2 are processed by means of an estimation circuit 145. The estimation circuit 145 functions to cross correlate S1 and S2 and estimate a phase correction factor as well as a gain correction factor. These factors are derived in a way such that if they are applied to S1, they produce an estimate of S2. Mathematically, this can be expressed as follows:

$$\hat{S2} = -G * S1 * \exp(j\phi)$$

where $\hat{S2}$ is the estimate of the transmit noise signal S2, G is the gain factor and $\phi$ is the phase factor. $\hat{S2}$ represents the equivalent transmit noise. Se=$\hat{S2}$+S2 represents the error on the transmit noise estimate. Se/S2 represents the noise reduction factor.

In practice, S1 and S2 are provided to a signal correlator circuit which compares and correlates the reference and the transmit noise signals and generates an adjusted signal (in phase and in amplitude) which corresponds to an estimate of the transmit noise. The estimation circuit produces a phase factor and a gain factor which will be applied to the reference signal during the noise cancellation mode.

Note that during the calibration mode, when the antenna is isolated, a dummy load (not shown) is used to emulate the antenna. Switches (not shown) should be closed to connect the dummy load and disconnect the antenna.

Figure 6:
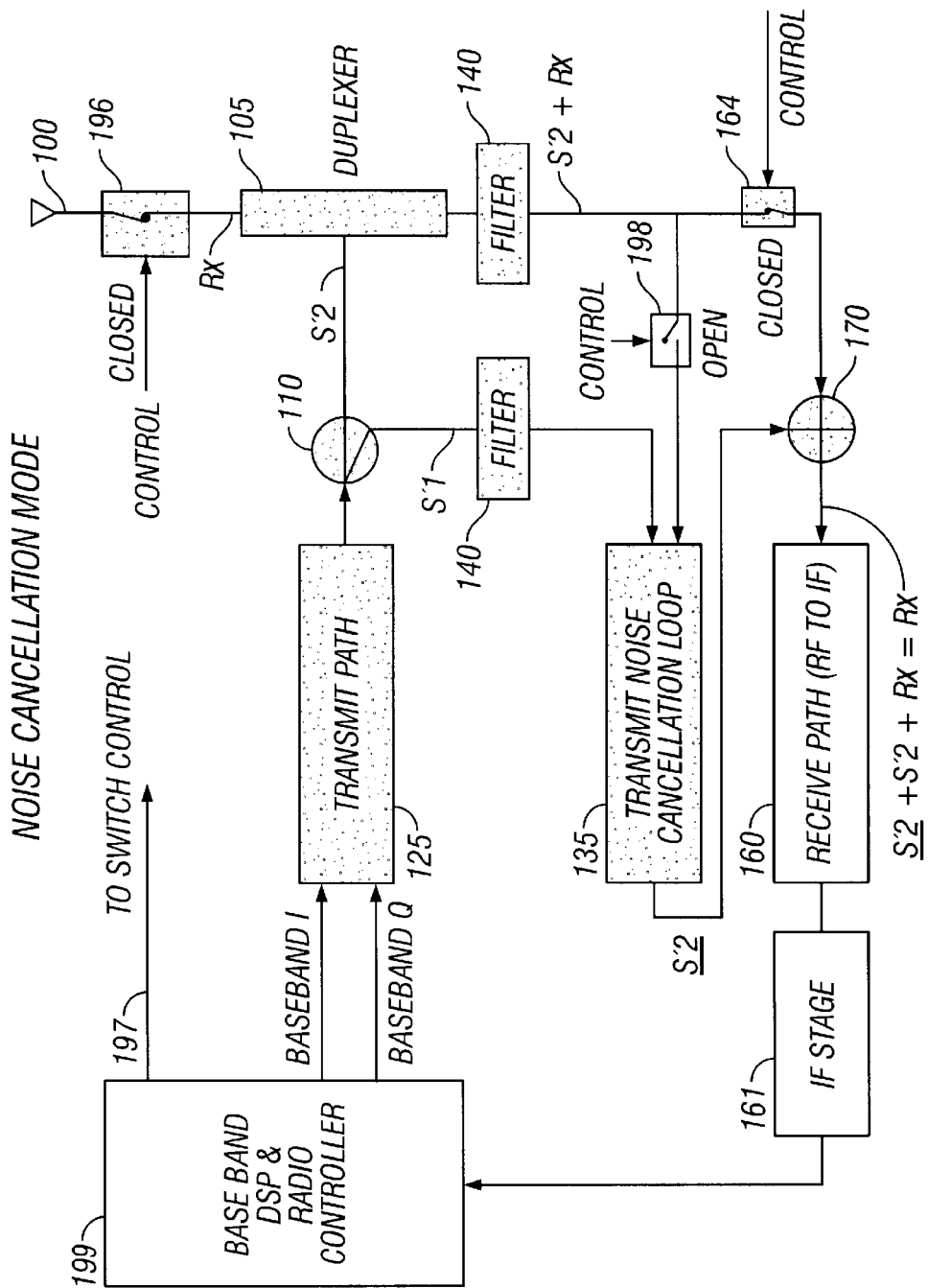
FIG. 6 shows a block diagram for the system operation during the noise cancellation mode according to one embodiment of the present invention.

Referring to FIGS. 1 and 6, the second mode is the noise cancellation mode. During the noise cancellation mode, the radio controller 199 sends a control signal to switches 196 and 164 to close them and a control signal to switch 198 to open it. The antenna is now connected to the transceiver and the radio is therefore connected to the outside world. During this mode of operation, the radio is intended to be operating in a full duplex mode. Referring to FIG. 6, a transmit signal is generated by the radio controller 199. The transmit signal goes through transmit path 125. After that, the transmit signal goes through a splitter 110. The larger portion of the signal (>99%) goes through the duplexer and the antenna to be transmitted over the air. The remaining portion of the transmit signal goes through two other paths. A first portion of the remaining signal S'1 is a reference signal and it goes through a first path. A second portion of the remaining signal S'2 goes through a second path. S'1 goes through filter 140 and transmit loop 135 where it gets adjusted in gain and phase to become an equivalent noise signal S'2 where the gain G and phase φ were those calculated during the calibration mode discussed above. Signal S'2 represents the transmit noise signal. S'2 goes through filter 140 and switch 164. The transmit noise signal S'2 gets added to the equivalent noise signal S'2 and therefore gets substantially canceled.

Figure 3:
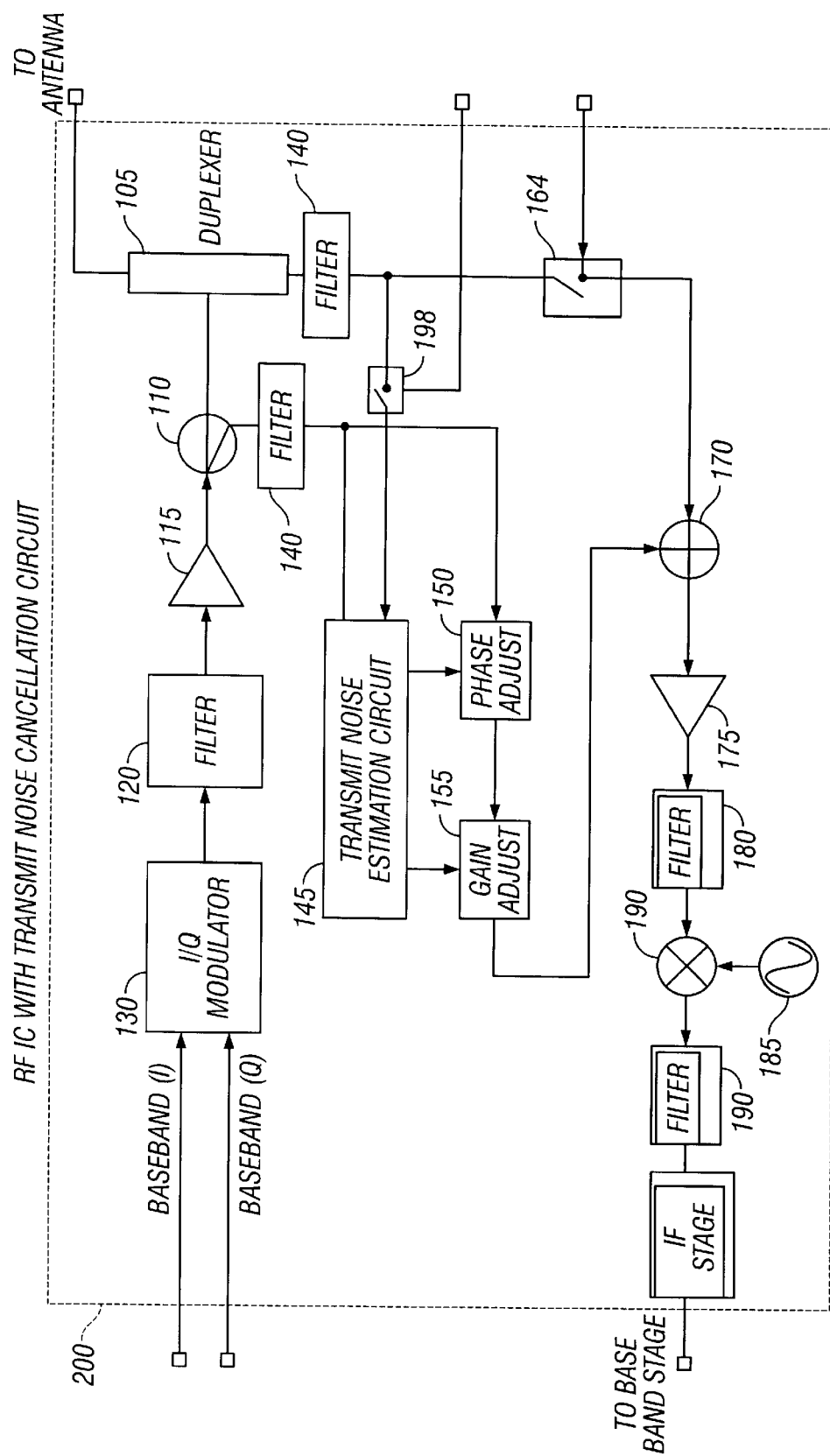
FIG. 3 shows a transmit/receive RF single IC chip implementation according to another embodiment of the present invention.

FIG. 3 shows a transmit/receive RF single IC chip implementation according to another embodiment of the present invention. The noise cancellation circuit described above can be used in the design of a single RF IC chip solution that incorporates both a transmit and a receive circuit.

Figure 4A:
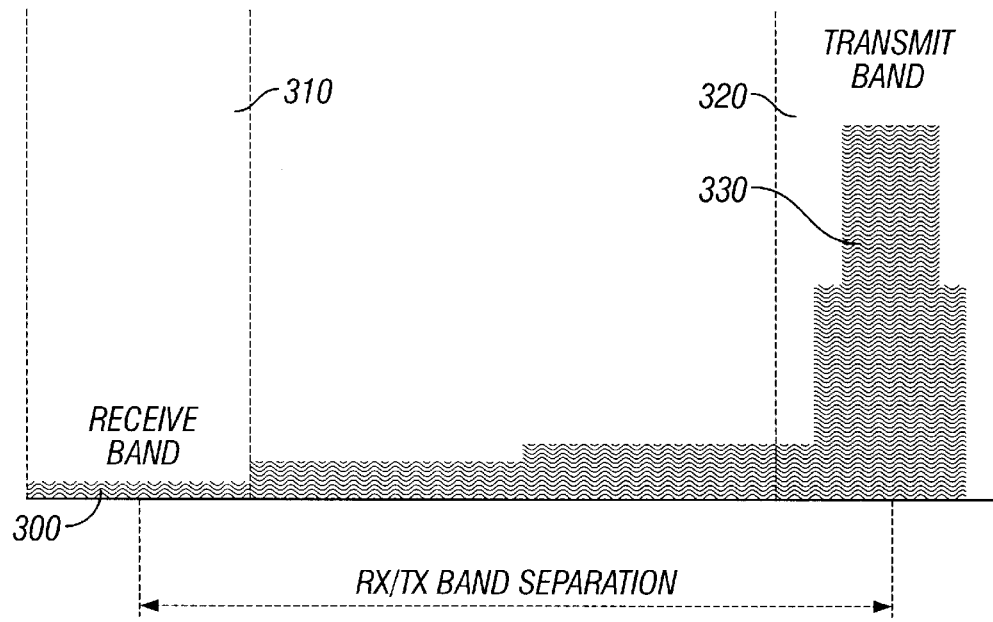
FIG. 4A shows a spectral representation of the transmit signal leakage into the receive band.
Figure 4B:
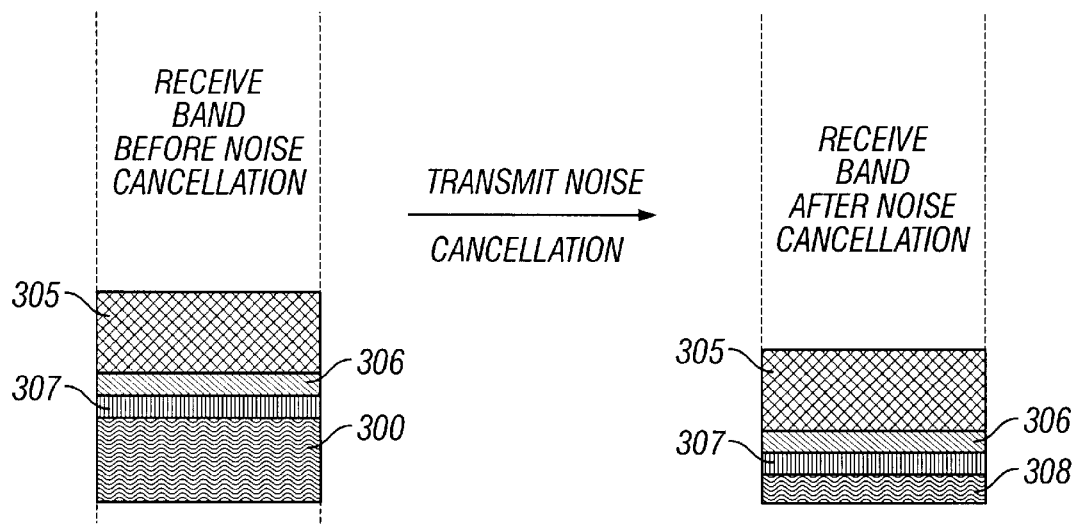
FIG. 4B shows an example result in the spectrum domain of the noise cancellation technique according to an embodiment of the present invention.

FIG. 4–A illustrates the signal leakage of the transmitted signal 330 from the transmit band 320 into the receive band 310. One of the major goals of the present invention is to mitigate the transmit noise signal 300 that has leaked into the receive band.

FIG. 4–B illustrates an examplary result of the noise cancellation technique according to the present invention. The transmit noise signal 300 has been reduced to noise signal 308. The receive signal 305, the adjacent channel noise signal 306 and the thermal noise signal 307 remain substantially unchanged after the transmit noise cancellation.

Figure 7:
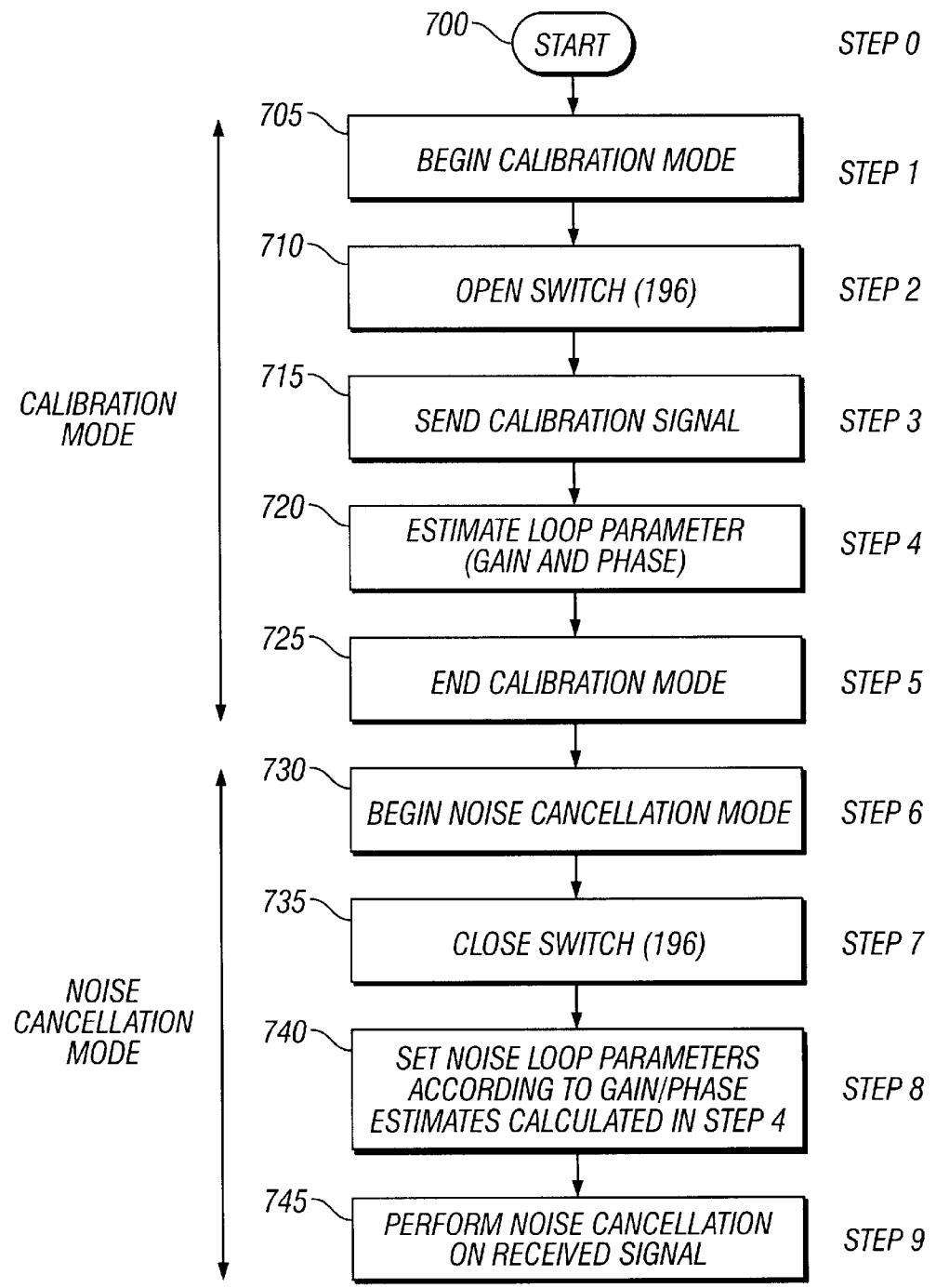
FIG. 7 shows the steps required to perform the noise cancellation operation according to one embodiment of the present invention.

FIG. 7 illustrates the steps of operation of the present invention. Steps 1 to 5 represent the calibration mode while steps 6 to 9 represent the noise cancellation mode. The calibration mode should preferably be performed every time the radio is turned on. Alternatively the calibration mode may be done sequentially, even during the radio's full duplex operation. For this sequential calibration alternative, it is preferred that the radio calibration be performed during the idle mode (where the radio is not receiving or transmitting).

Figure 8:
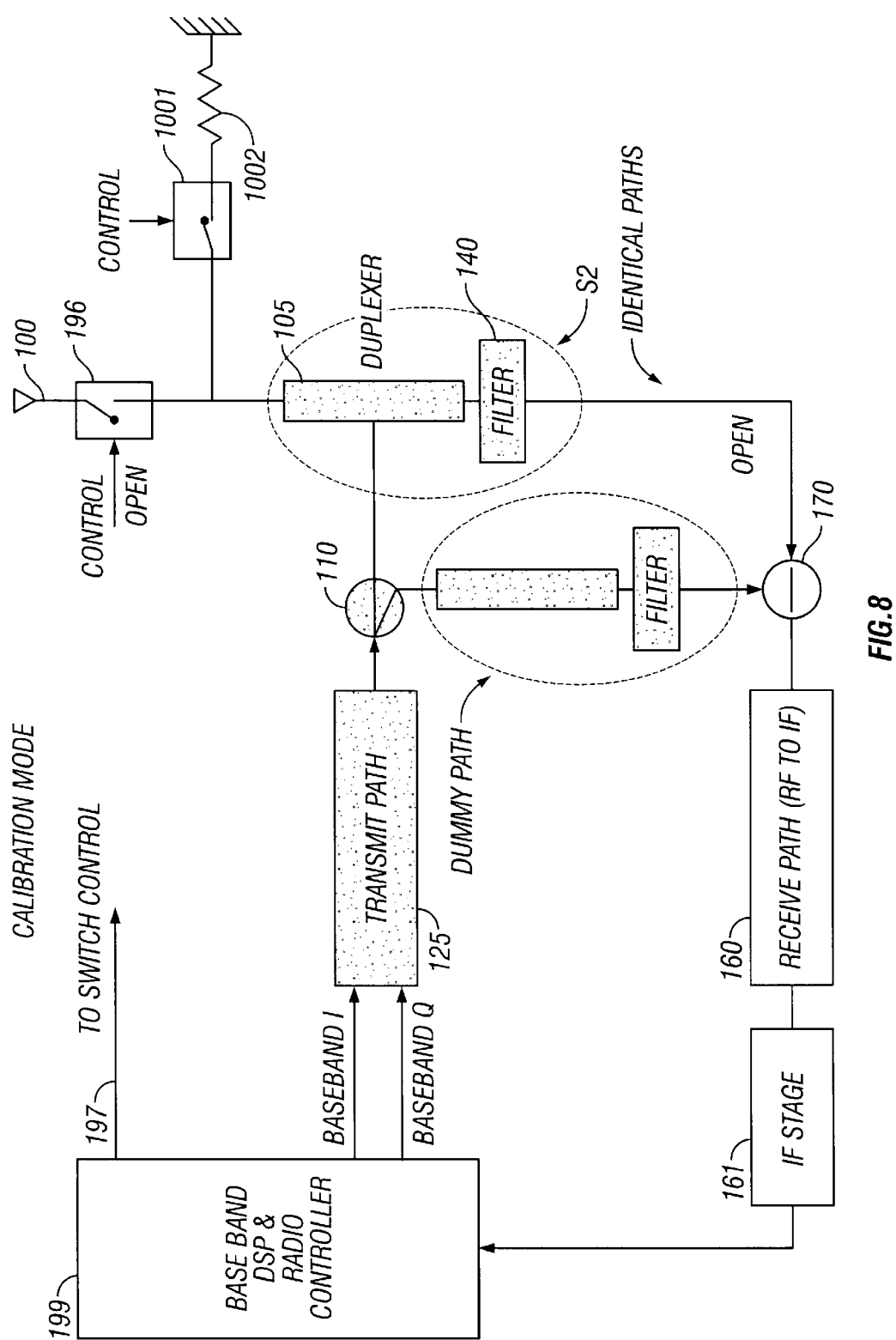
FIG. 8 shows a second embodiment of the present invention.

In a second embodiment as seen in FIG. 8, an identical path to the one that passes by duplexer 105 and filter 140 can be duplicated. The signal that goes through this path can be subtracted directly from the overall received path.

Figure 9:
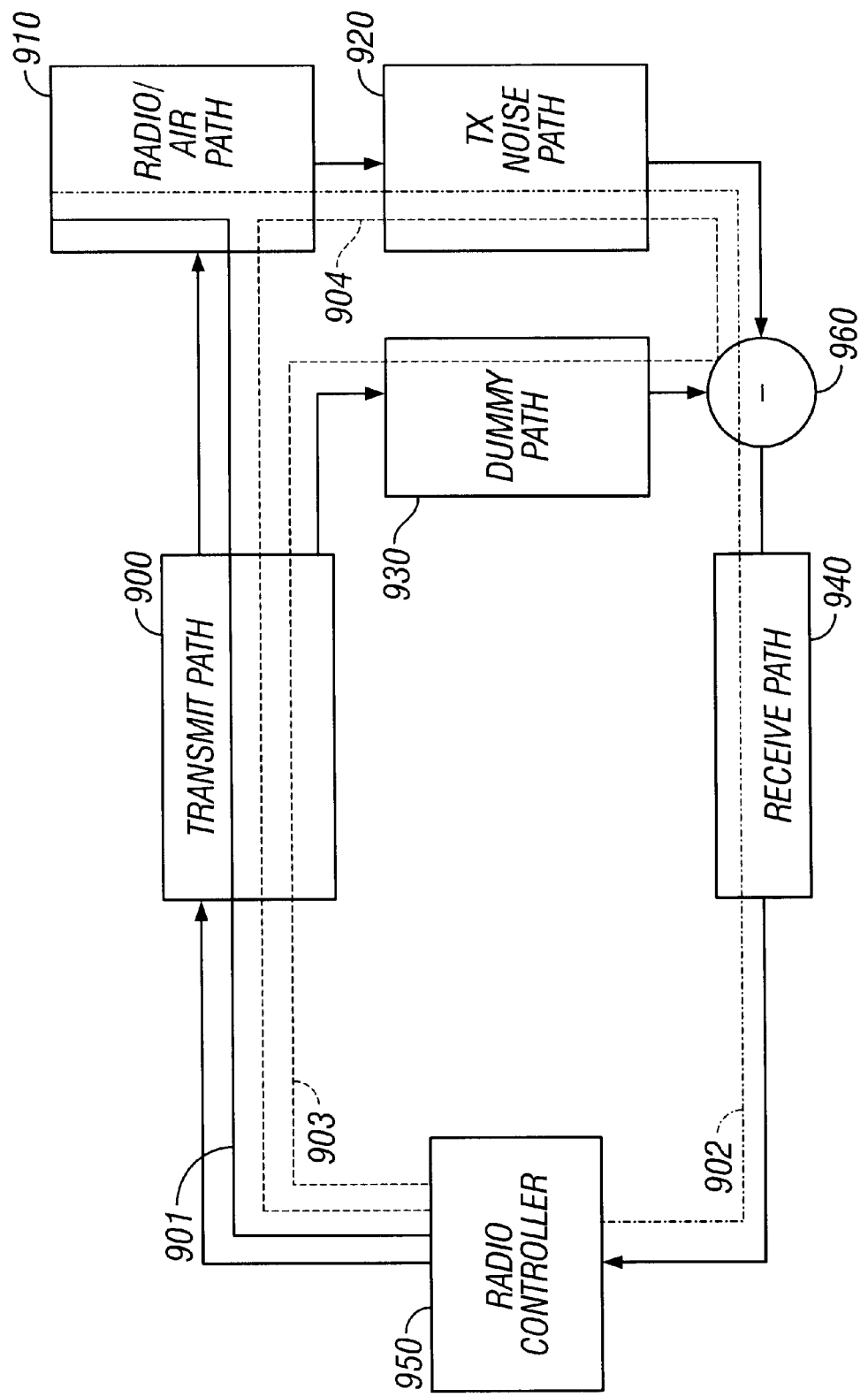
FIG. 9 shows a general implementation of the second embodiment of the present invention as shown in FIG. 8.

FIG. 9 depicts a general implementation of the second embodiment of the present invention as shown in FIG. 8. Referring to FIG. 9, radio controller 950 sends a signal which has three different components. A first signal, referred to as transmit signal 901 goes through transmit path 900 and radio/air path 910. A second signal referred to as dummy signal or reference signal 903 goes through transmit path 900 and dummy path 930. A third signal also referred to as a transmit noise signal 904 goes through transmit path 900 and transmit noise path 920. The dummy path 930 is designed intentionally to be identical to the transmit noise path 920. Because of this special design, reference signal 903 and transmit noise 904 are approximately identical. When the two signals 904 and 903 get combined by subtractor 960, they cancel each other. Only the desired receive signal 902 makes it to the radio controller. Desired receive signal 902 is the signal that was received over the air and that went through radio/air path 910, TX noise path 920, subtractor 960, receive path 940 to get to the radio controller 950.

Typically, the major transmit noise enters the system from the duplexer 105. In practice, there is noise leakage that can enter the receive path at many other points including the LNA 175 input or the filter 180 or the mixer 190, etc. The present invention can be generalized to include multiple parallel noise cancellation loops to account for the noise entering the receive path from many points. The problem can also be solved by using a single cancellation loop that can be sequentially connected (through a programmable switching mechanism) to a different point within the receive path. Once a list of phase/gain's is determined, the loop can be set to its initial position and a combined equivalent noise signal can be calculated according to each of the calibrated paths.

This invention can also be used to provide noise cancellation in co-located transmit/receive systems where the receiver and transmitter are at the same site but are not on a single IC chip. In a third embodiment, the switch 196 can be removed, provided that the radio is tuned to a frequency band where there is no signal in the air that can impact the accuracy of the calibration mode. If there is no signal on the air, then the antenna can be assumed to be virtually not connected and the calibration can be performed efficiently.

In a fourth embodiment, the antenna can be left connected, provided that the calibrating signal that goes into the transmit noise cancellation loop can be made much higher than the received signal. Calibration can be made successfully since the signal coming from the air is negligible when compared to the calibration signal. A drawback of this implementation relates to the fact that the radio will be radiating a transmit signal high enough to cause interference to other radios in the neighborhood.

In a fifth embodiment, the calibration mode of FIG. 7 can occur during an event selected from a group including powering-up the communications system, idle mode, roaming mode, power-off, standby mode, connecting mode, dialing a telephone number, or hand-off. In an alternative embodiment, the calibration may be done periodically or even dynamically during full duplex operation.

The specific embodiments of the present invention described above are illustrative of the present invention and are not intended to limit the invention to the particular embodiments described. Accordingly, while one embodiment of the invention has been illustrated and described, it will be appreciated that various changes can be made therein without departing from the spirit and scope of the invention.

What is claimed is:

1. A method in a RF communications system for improving a received communications signal during full duplex operation, wherein said RF communications system comprises a transmitter circuit and a receiver circuit, said method comprising:

determining a first estimation of a signal leakage from said transmitter circuit, when said received communications signal is not being received by said receiver circuit;

when said RF communications system is in full duplex operation and said transmitter circuit is generating a transmit communication signal, determining a second estimation of said signal leakage based on said first estimation and said transmit communication signal; and combining said second estimation with said received communications signal, such that said signal leakage is substantially cancelled in said received communications signal.

2. The method of claim 1 wherein said transmitter circuit and said receiver circuit are on a single RF IC chip.

3. The method of claim 1 wherein said determining a first estimation of said signal leakage comprises disconnecting an antenna of said RF communications system.

4. The method of claim 3 wherein said determining said first estimation of said signal leakage further comprises connecting a dummy load emulating said antenna.

5. The method of claim 1 wherein said determining said first estimation of said signal leakage includes tuning said receiver circuit to a clean frequency band.

6. The method of claim 1 wherein said determining said first estimation of said signal leakage comprises:

generating a calibration signal based on a pseudo-random noise sequence;

splitting said calibration signal into a first signal and a second signal, wherein said first signal is sent to an estimation circuit and said second signal is further divided into a third signal sent to a dummy antenna load and a fourth signal sent to said estimation circuit; and cross correlating said first signal and said fourth signal in said estimation circuit to produce said first estimation.

7. The method of claim 6 wherein said determining said second estimation based on said first estimation comprises:

splitting said transmit communication signal into a fifth signal and a sixth signal, wherein said fifth signal is sent to said estimation circuit and said sixth signal is sent to an antenna; and using parameters from said first estimation, determining in said estimation circuit said second estimation from said fifth signal.

8. A method in an RF IC communications system for substantially canceling transmitter noise during full duplex operation, wherein said RF IC communications system comprises a transmitter and a receiver, said method comprising:

generating a predetermined calibration signal;

calibrating said RF IC communications system by sending said calibration signal to a transmit noise cancellation loop circuit;

determining loop parameters for said transmit noise cancellation loop circuit;

when in full duplex operation, estimating a transmit noise signal based on said loop parameters; and substantially canceling said transmit noise signal from a received signal during full duplex operation.

9. The method of claim 8 wherein said loop parameters include gain and phase.

10. The method of claim 8 wherein said transmitter and said receiver are on different IC chips.

11. The method of claim 8 wherein said transmitter and said receiver are on a single RF IC chip.

12. The method of claim 8 wherein said step of calibrating said RF IC communications system occurs on power-up of said RF IC communications system.

13. The method of claim 8 wherein said step of calibrating said RF IC communications system occurs during an event selected from a group consisting of power-up, idle mode, roaming mode, power-off, standby mode, connecting mode, dialing a number, or hand-off.

14. The method of claim 8 wherein said step of calibrating said RF IC communications system occurs periodically.

15. The method of claim 8 wherein said step of calibrating said RF IC communications system occurs dynamically during full duplex operation.

16. A method in an RF IC communications system for substantially canceling transmitter noise during full duplex operation, wherein said RF IC communications system comprises a transmitter and a receiver, said method comprising:

calibrating said RF IC communications system by disconnecting an antenna of said RF IC communications system and sending a calibration signal to a transmit noise cancellation loop circuit;

determining loop parameters for said transmit noise cancellation loop circuit;

when in full duplex operation, estimating a transmit noise signal based on said loop parameters; and substantially canceling said transmit noise signal from a received signal during full duplex operation.

17. A method in an RF IC communications system for substantially canceling transmitter noise during full duplex operation, wherein said RF IC communications system comprises a transmitter and a receiver, said method comprising:

calibrating said RF IC communications system by sending a calibration signal to a transmit noise cancellation loop circuit, wherein the power of said calibration signal is increased relative to any received signal so that calibration is done without disconnecting an antenna of said RF IC communications system;

determining loop parameters for said transmit noise cancellation loop circuit;

when in full duplex operation, estimating a transmit noise signal based on said loop parameters; and substantially canceling said transmit noise signal from a received signal during full duplex operation.

18. A RF communications system that substantially cancels transmitter noise during full duplex operation, comprising:

a transmit path coupled to a noise cancellation loop, and further coupled to an antenna when said RF communications system is in full duplex mode;

a received path coupled to said noise cancellation loop and further coupled to said antenna and said transmit path when said RF communications system is in full duplex mode;

said noise cancellation loop using a predetermined calibration signal to approximate a transmit noise signal from said transmit path and to cancel said transmitter noise from a received signal coupled to said received path.

19. The RF communications system according to claim 18 wherein said noise cancellation loop sets parameters based on said predetermined calibration signal, said parameters used by said noise cancellation loop for generating said transmitter noise approximation.

20. The RF communications system according to claim 19 wherein said parameters include a phase and a gain.

21. The RF communications system according to claim 18 wherein said transmit path includes a circuit for converting a transmit signal at an intermediate frequency (IF) to a radio frequency (RF).

22. The RF communications system according to claim 18 wherein said receive path includes a circuit for converting said receive signal at a radio frequency (RF) to an intermediate frequency (IF).

23. The RF communications system according to claim 18 wherein said transmit path is coupled to said antenna via a duplexer circuit.

24. The RF communications system according to claim 23 wherein said receive path is coupled to said antenna via said duplexer circuit.

25. A method in a RF communications system for reducing transmit noise in a received communications signal during full duplex operation, wherein said RF communications system comprises a transmitter circuit, a duplexer, and a receiver circuit, said method comprising:

determining a first estimation of transmit noise from said transmitter circuit, when said received communications signal is not being received by said receiver circuit;

when said RF communications system is in full duplex operation and said transmitter circuit is generating a transmit communication signal, determining a second estimation of transmit noise based on said first estimation and said transmit communication signal; and combining said second estimation with said received communications signal, such that said transmit noise is substantially cancelled in said received communications signal.

26. The method of claim 25 wherein said step of determining a first estimation of transmit noise comprises:

generating a calibration signal;

splitting said calibration signal into a first signal and a second signal, wherein said first signal is sent to an estimation circuit and said second signal is further divided into a third signal sent to a dummy antenna load via said duplexer and a fourth signal sent to said estimation circuit; and cross correlating said first signal and said fourth signal in said estimation circuit to produce said first estimation.

27. The method of claim 25 wherein said step of determining said second estimation based on said first estimation comprises:

splitting said transmit communication signal into a fifth signal and a sixth signal, wherein said fifth signal is sent to an estimation circuit and said sixth signal is sent to an antenna via said duplexer; and using parameters from said first estimation, determining in said estimation circuit said second estimation from said fifth signal.

28. The method according to claim 27 wherein said parameters include a phase and a gain.

29. The method of claim 25 wherein said step of combining said second estimation with said received communications signal, such that said transmit noise is substantially cancelled in said received communications signal, comprises:

obtaining a seventh signal from said duplexer comprising said received communications signal and transmit noise from said duplexer; and combining said second estimation with said seventh signal, such that said transmit noise is substantially cancelled in said received communications signal.

30. A RF IC chip that substantially cancels transmitter noise during full duplex communications, comprising:

a calibration path, comprising a transmit path coupled to a noise cancellation loop and via a duplexer to an antenna dummy load, said calibration path for determining parameters associated with an estimate of a first transmitter noise signal from said duplexer, when a calibration signal is sent to said antenna dummy load; and a full duplex operation path, comprising:

a first path comprising a transmit path coupled to said duplexer and an antenna for transmitting a first communications signal;

a second path comprising a transmit path coupled to said noise cancellation loop for determining an estimate of a second transmitter noise signal, using said parameters and a portion of said first communications signal; and a third path coupled to said antenna and said duplexer for receiving a second communications signal; and a fourth path coupled to said duplexer and a receive path for canceling transmitter noise added by said duplexer to said second communications signal by using said estimate of said second transmitter noise signal.

31. A RF IC chip of claim 30 wherein said parameters include a gain and a phase of said first transmitter noise signal.

* * * * *